United States Patent
Elliott et al.

(10) Patent No.: US 10,474,221 B2
(45) Date of Patent: Nov. 12, 2019

(54) POWER CONTROL IN A STORAGE SUBSYSTEM

(71) Applicant: HEWLETT PACKARD ENTERPRISE DEVELOPMENT LP, Houston, TX (US)

(72) Inventors: Robert C. Elliott, Houston, TX (US); David Wagner, Houston, TX (US); Michael McGowen, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 95 days.

(21) Appl. No.: 15/883,939

(22) Filed: Jan. 30, 2018

(65) Prior Publication Data

US 2019/0235613 A1    Aug. 1, 2019

(51) Int. Cl.
G06F 1/32     (2019.01)
G06F 1/3287   (2019.01)
G06F 1/3234   (2019.01)

(52) U.S. Cl.
CPC .......... G06F 1/3287 (2013.01); G06F 1/3268 (2013.01); G06F 1/3275 (2013.01)

(58) Field of Classification Search
CPC .............................. G06F 1/3268; G06F 1/3275
See application file for complete search history.

(56) References Cited

U.S. PATENT DOCUMENTS

| | | | |
|---|---|---|---|
| 7,539,881 B2 | 5/2009 | Shaw et al. | |
| 9,568,966 B2 | 2/2017 | Berke et al. | |
| 2006/0005057 A1* | 1/2006 | Nalawadi | G06F 1/3203 713/320 |
| 2008/0259710 A1* | 10/2008 | Wenzel | G06F 1/3221 365/226 |
| 2009/0083483 A1 | 3/2009 | Balakrishnan et al. | |
| 2012/0198254 A1 | 8/2012 | Allalouf et al. | |

OTHER PUBLICATIONS

Hewlett Packard Enterprise Development LP., "HPE ProLiant Server Power Management: Red Hat Enterprise Linux 6.x and 7.x," Sep. 2016, (15 pages) https://h50146.www5.hpe.com/products/software/oe/linux/mainstream/support/whitepaper/pdfs/4AA5-4240ENW_2016.pdf>.

Hewlett-Packard Development Company, L.P., "Dynamic Power Capping: Frequently Asked Questions," Dec. 28, 2011, (web page) (2 pages) <https://web.archive.org/web/20111228222040/http://h18004.www1.hp.com/products/servers/management/dynamic-power-capping/faq.html>.

Hewlett-Packard Development Company, L.P., "HP Power Capping and HP Dynamic Power Capping for ProLiant servers," Technology brief, 2nd Edition, Jan. 2011 (25 pages) <https://web.archive.org/web/20110811190939/http://h20000.www2.hp.com/bc/docs/support/SupportManual/c01549455/c01549455.pdf>.

IBM, "Setting the Power Cap Value," (Research Paper), Dec. 18, 2008, 3 pages, https://www.ibm.com/support/knowledgecenterien/SSAV7B_635/com.ibm.director.aem.helps.doc/frb0_t_power_cap.html.

(Continued)

*Primary Examiner* — Albert Wang (57) ABSTRACT

Certain examples described herein relate to power control in a storage subsystem. Some examples may detect a new storage device and inhibit activation of the new storage device responsive to a determination that activating the new storage device would exceed a power limit.

15 Claims, 5 Drawing Sheets

(56) References Cited

OTHER PUBLICATIONS

Mark Fontecchio, "HP announces Dynamic Power Capping for ProLiant servers," Nov. 4, 2008, SearchDataCenter.com, (web page) (2 pages) <http://searchdatacenter.techtarget.com/news/1337665/HP-announces-Dynamic-Power-Capping-for-ProLiant-servers?vgnextfmt=print>.

Simon Seagrave, "HP Dynamic Power Capping," available Dec. 2008, Techhead, (web page), <http://techhead.co/hp-dynamic-power-capping/> (9 pages).

Wikipedia, "Spin-up," Jul. 7, 2017, <https://en.wikipedia.org/w/index.php?title=Spin-up&oldid=789521594> (2 pages).

\* cited by examiner

POWER CONTROL IN A STORAGE SUBSYSTEM

BACKGROUND

Server computing devices form the backbone of many modern computing applications and services. Often, multiple server computing devices are combined in clusters of hundreds or thousands of devices to provide services to millions of client devices around the world, such as over the Internet. High availability clusters are designed to be active at all times and downtime is often limited to a fraction of a percent of operational time. Often such clusters provide redundancy to allow continued operation even if a specific server computing device fails. At both small and large scales, power consumption often becomes a limiting factor for performance. This is especially the case for co-located server computing devices as a large proportion of supplied power is used for cooling.

BRIEF DESCRIPTION OF THE DRAWINGS

Various features of the present disclosure will be apparent from the detailed description which follows, taken in conjunction with the accompanying drawings, which together illustrate, features of certain examples, and wherein.

DETAILED DESCRIPTION

Certain examples herein relate to controlling power use by a storage subsystem to meet a power limit for the subsystem. In particular, these examples help address an issue of hardware configuration changes to the storage subsystem during powered operation.

Data storage for modern server computing devices may be supplied using multiple data storage devices. For example, multiple data storage devices may be configured as a Redundant Array of Independent Disks (RAID) array or other cluster of devices to provide distributed data storage, redundancy and increased performance. In these cases, data may be duplicated across multiple physical disks that are presented to a computing device as one or more logical units. In examples described herein, a data storage device may comprise a hard disk (i.e. magnetic) drive, solid state storage (e.g. a solid state drive—SSD), an optical drive, a tape drive, or the like. Data storage devices may comprise one or more of volatile and non-volatile data storage. A data storage device may comprise Random Access Memory (RAM), Read Only Memory (ROM) flash memory, or combinations thereof. For example, a data storage device may include Non-Volatile Random Access Memory (NVRAM), Electrically Erasable Programmable Read-Only Memory (EEPROM), NAND flash memory, or the like. Data storage devices may supply so-called "persistent memory", e.g. comprise devices where data is managed in Dynamic Random Access Memory and persisted to flash memory. Memory-based data storage devices may be provided as removable Dual In-Line Memory Modules (DIMM), which may be added and removed during powered operation.

To manage multiple data storage devices a storage controller may be provided. A storage controller may comprise an embedded computing device that provides a back-end interface to the set of data storage devices and a front-end interface to a host adapter of a computing device, such as a server computing device. The back-end interface provides a mechanism for communicating with and controlling the set of data storage devices. The front-end interface provides a mechanism for communicating with the server computing device. Each interface may be implemented by a number of layers, e.g. in a communications protocol stack, with different protocols being used at different layers of the stack. A storage controller may use different or common protocols for both interfaces. A variety of protocol configurations are possible. An example configuration may have a front-end interface based on a Peripheral Component Interconnect (PCI) standard such as PCI Express (PCIe), and one of Serial Attached Small Computer System Interface (SCSI)—SAS, Serial Advanced Technology Attachment (ATA)—SATA, or PCI on the back-end interface. In such an example, the following protocols may be used over a PCI-based interface: proprietary protocols for SAS, SCSI Express (also known as SCSI over PCIe—SOP), PCIe Queuing Interface (PQI), Advanced Host Controller Interface (ADHC), Non-Volatile Memory Express (NVMe), or the like. In an example where the storage controller is implemented as part of an independent enclosure, the front-end interface may be implemented as one of Fibre Channel Protocol (FCP) over a Fibre Channel interconnect, Internet SCSI (iSCSI) over Ethernet, or NVMe Over Fabrics (NVMeOF), or the like. For memory-based data storage devices, a Double Data Rate (DDR) memory interface such as DDR4, may be used. Other protocols and standards may alternatively be used depending on the implementation, including but not limited to Enterprise Systems Connection (ESCON), HyperSCSI, Gen-Z consortium standard and InfiniBand (IB). If the storage controller is arranged to manage memory devices, it may use an interconnect of a Central Processing Unit (CPU), e.g. a proprietary protocol provided by the CPU manufacturer.

A storage controller may be provided as part of a housing or enclosure that is physically independent of a computing device (e.g. as a couplable rack unit), as part of the system components of the computing device (e.g. as part of a motherboard), or as an add-on component to the computing device (e.g. in the form of an expansion card). A storage controller may be coupled to a computing device via a local system bus based on a PCI standard such as PCIe. A storage controller may be transparent to an operating system of a coupled server computing device; the server computing device may simply detect the presence of the logical units provided by the storage controller and coupled data storage devices.

Certain storage controllers may have a limit to the number of data storage devices that can be attached. For example, a storage controller using SAS on the back-end interface may be coupled to up to 8 data storage devices. These limits may be overcome by using an expander. This may be provided as part of the storage controller or as a separate component that couples to the storage controller. An expander may allow multiplexing of data access commands to support additional data storage devices, such as up to 25 devices.

Storage controllers may allow for the replacement or addition of data storage devices without stopping or shutting down either the storage controller or a coupled server computing device. This is known as "hot-plugging". "Hot-plugging" may include, amongst others, "hot-adding", "hot-removing", and "hot-swapping" ("hot-removing" followed by "hot-adding"). "Hot-adding" may allow storage capacity to be increased during operation. This allows components to be added or removed during powered operation, i.e. while devices are receiving power. This is useful for high availability server computing devices; failing components may be replaced and additional resources added without shutting down an operating system and associated services and removing power from the device. For example, in a data storage context, failing hard disk drives in a RAID array may be replaced, and additional data storage capacity may be installed. Similarly, if user data is stored in a DIMM with persistent flash storage, the DIMM may be moved between server computing devices, e.g. to upgrade capacity or if device failure occurs. If the system supports "hot-plugging", this may be performed without removing power from either the storage controller or the server computing device, and thus without interrupting the supply of applications and services by the server computing device. In implementations where the storage controller forms part of an independent enclosure, the enclosure may have bays for the insertion of multiple hard disk or solid state drives in this manner. In certain cases, data storage may be inserted in blocks of multiple data storage devices, e.g. an enclosure may allow for a unit of four drives to be added as a block.

Certain examples described herein allow a power limit to be set for a storage subsystem and enforced by a storage controller. The storage controller controls the activation of data storage devices such that the power limit is met.

In certain examples described herein an issue of power control for hot-pluggable data storage devices is addressed. For example, when a data storage device is added to increase capacity this will also increase power consumption. When data storage devices are first activated, e.g. after receiving power when coupled to an interface or interconnect that allows hot-plugging of devices, they may consume more power than during normal operation (e.g. to spin-up rotating media on hard disk drives and/or to perform initialization tests). For example, an enclosure of 25 such hard disk drives, coupled via an expander to a storage controller, would consume 625 W within a minute of being installed and connected to a server computing device. In comparison, a typical power limit for a server computing device may be 400 W.

Certain examples described herein address an issue of power control for hot-pluggable data storage devices by detecting a newly coupled data storage device and by modifying normal operation to prevent the device from reaching an operational state if this would exceed a power limit set for the storage subsystem. This may be implemented by the storage controller.

Figure 1:
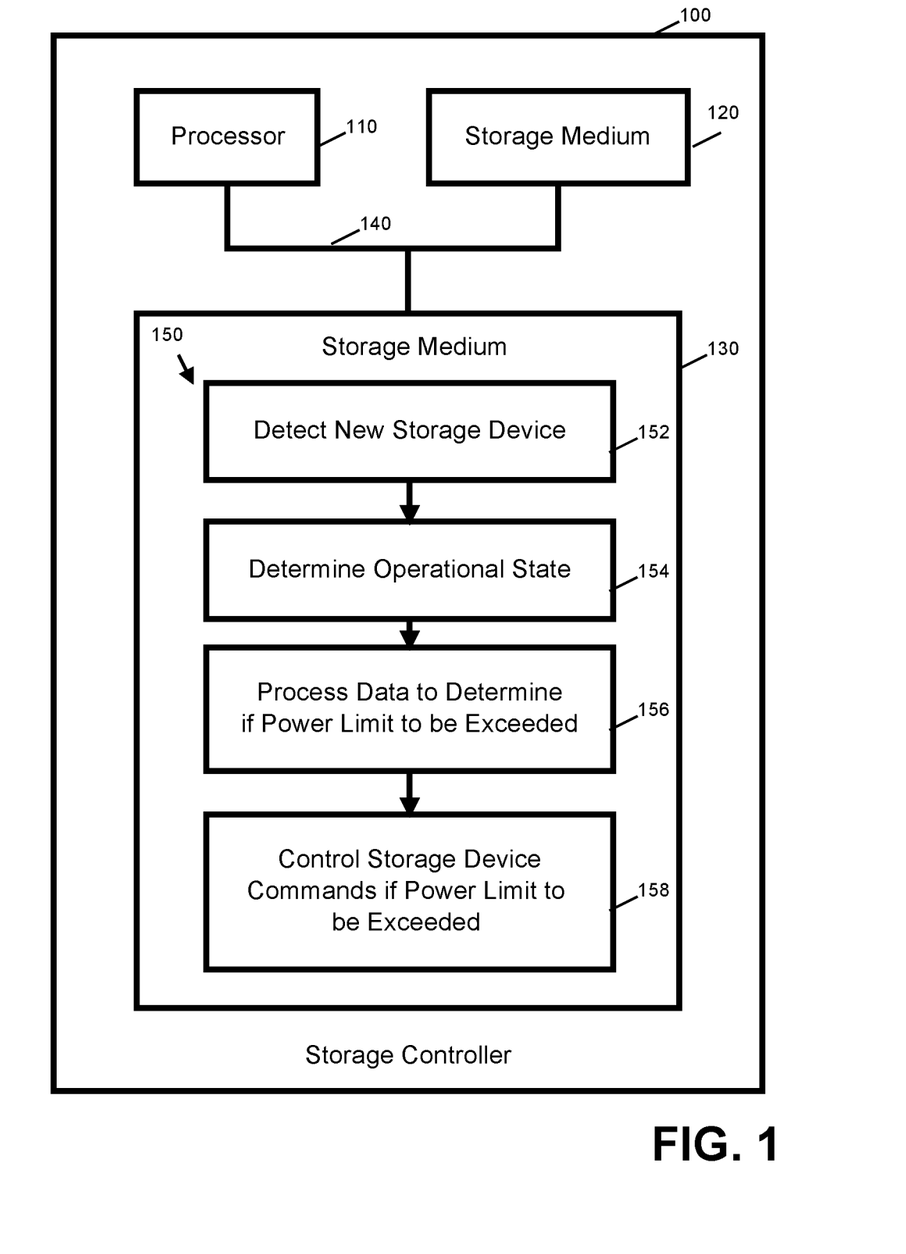
FIG. 1 is a schematic diagram of a storage controller according to an example.

FIG. 1 shows a storage controller 100 according to an example. The storage controller 100 is configured to control a plurality of storage devices to implement a storage subsystem. The storage controller 100 may have any of the characteristics discussed above, e.g. may be a RAID controller, may use any of the above-mentioned protocols etc. The plurality of storage devices may be data storage devices as discussed in previous paragraphs. The storage subsystem may be seen as the combination of storage controller 100 and the plurality of storage devices that acts to provide logical units of data storage to a computing device. The storage controller may be seen as a device that communicates directly with the data storage devices.

The storage controller 100 comprises a processor 110, a first storage medium 120 and a second storage medium 130. In the example of FIG. 1 these are coupled by a system bus 140. In certain cases, these components may be implemented by separate circuitry, e.g. on a printed circuit board (such as a motherboard). In other cases, they may be implemented in a common integrated circuit, such as according to a system-on-a-chip design. Combinations of these approaches are also possible.

The processor 110 is arranged to, in use, control the operation of the plurality of storage devices such that power use by the storage subsystem is maintained below the power limit. The processor 110 may include at least one CPU, at least one semiconductor-based microprocessor, other hardware devices or processing elements suitable to retrieve and execute instructions stored in memory, or combinations thereof. In one case, the processor 110 may comprise part of control circuitry including an Application Specific Integrated Circuit (ASIC) or a Field Programmable Gate Array (FPGA). The processor can include single or multiple cores on a chip, multiple cores across multiple chips, multiple cores across multiple devices, or combinations thereat. The processor may fetch, decode, and execute instructions from memory to perform various functions. Instructions may be loaded into memory from the storage medium 130. As an alternative or in addition to retrieving and executing instructions, the processor may include at least one integrated circuit (IC), other control logic, other electronic circuits, or combinations thereof that include a number of electronic components for performing various tasks or functions as described herein.

The first storage medium 120 is arranged to store data indicative of a power limit for the storage subsystem. The second storage medium 130 is arranged to store a set of instructions 150 for execution by the processor 110 to cause processor 110 to perform at least the functionalities described herein in relation to instructions 152, 154, 156, and 158. The first storage medium 120 and the second storage medium 130 may form part of a common local storage device or may be provided by different storage devices. In one case, the first storage medium 120 may comprise a volatile or non-volatile memory or register accessible to the processor 110. The first storage medium 120 and the second storage medium 130 may comprise, for example, various RAM, ROM, flash memory, and combinations thereof. For example, the machine-readable medium may include a Non-Volatile Random Access Memory (NVRAM), an Electrically Erasable Programmable Read-Only Memory (EEPROM), a storage drive, a NAND flash memory, and the like. The machine-readable medium may alternative comprise solid state or magnetic storage or the like. The first storage medium 120 and the second storage medium 130 may be integrated with the processor 110 or provided separately.

In FIG. 1, the second storage medium 130 comprises computer-readable instructions 150 that, when executed by the processor, cause the processor to execute instructions 152 to 158. Via instructions 152, processor 110 may detect a new storage device that is coupled to the storage controller during powered operation of the storage controller. For example, this may be the detection of one or more hot-pluggable disk drives or memory devices. Detection may occur by detecting a power drawn across a set of electrical connectors and/or by data received upon one or more data lines. The electrical connectors and data lines in this case may form part of the electrical interconnect between the storage device and the storage controller. Powered operation refers to a state where the storage controller is operational and receiving power. This may also be a state where a server computing device that is using the storage controller is also operational and receiving power (i.e. is switched "on"). Powered operation also refers to the state whereby storage devices that are physically coupled to the storage device are receiving power. Powered operation may be contrasted with a "cold" state of the storage controller, wherein the storage controller does not receive power.

Via instructions 154, the processor 110 may determine an operational state of the storage subsystem. This may comprise determining, directly or indirectly, a power drawn by the storage subsystem. A direct power measurement may be made based on voltage and/or current levels accessible to the storage controller. An indirect power measurement may be made by determining a number of storage devices that are currently coupled to the storage controller. In certain cases, via instructions 154, the processor 110 may retrieve an operating specification for the storage controller 100. The operating specification may comprise data indicating a set of coupled storage devices and their power specifications, such as their power use in one or more states. Via instructions 154, the processor 110 may determine a state of each coupled storage device and use the operating specification to determine a current power use based on the state and the data indicating the device power specifications.

Via instructions 156, the processor 110 may process data associated with the new storage device, data associated with the operational state and the data indicative of the power limit to determine whether activating the new storage device would exceed the power limit. At this operation, the data indicative of the power limit may be retrieved from the first storage medium 120. Data associated with the new storage device may be retrieved from storage such as the first storage medium 120 or the second storage medium 130 or another memory. Data associated with the new storage device may comprise a power specification for the new storage device. In one case, data associated with the new storage device may be retrieved based on data received over an interconnect of the storage controller 100. For example, data associated with the new storage device may be received over a data line when the device is coupled to the interconnect but before an operational state is reached. Data associated with the operational state may be based on the operational state determined using instructions 154.

Instructions 156, when executed, may cause processor 110 to perform functions comprising determining whether a sum of the current power use and the power use of the new storage device in an operational state exceeds the power limit. For example, the storage controller 100 may store data indicating a power limit of 40 W. The storage controller 100 may draw 5 W, leaving 35 W for data storage devices. At the time the new storage device is connected, the storage controller 100 may be managing two existing storage devices that are operating at a steady use operational state (e.g. that are spun-up and available for data input/output). These existing storage devices may consume 9 W each in this state, meaning a total use of 18 W. The new storage device may consume 25 W on start-up to bring it to the steady use operational state (e.g. consume 25 W during spin-up). In this case, the processor 110 would determine that the predicted power use of 5 W+18 W+25 W=48 W is greater than the power limit of 40 W. Hence, the processor 110 would determine that the power limit would be exceeded. In this case, if there was only one existing storage device then the predicted power use would be 5 W+9 W+25 W=39 W, which is below the power limit. The processor in this case would thus determine that the power limit would not be exceeded. These calculations may also be performed indirectly. For example, a power limit may be specified as a maximum number of coupled storage devices. The power use of the storage controller 100 may be included in the determination via instructions 156 directly or indirectly. In a direct case, the power drawn by the storage controller 110 (e.g. 5 W) may be included in computations (e.g. as shown above). In an indirect case, the storage controller 110 may compute a data storage device power limit that excludes its own power use (e.g. the 35 W limit above) and then not include its own power use in calculations, which are made relative to the data storage device power limit.

Via instructions 158, the processor 110 may control commands sent to the new storage device to inhibit activation of the new storage device responsive to a determination that activating the new storage device would exceed the power limit. For example, in comparative storage subsystems, the storage controller 100 may automatically spin-up a connected drive within a given time period (typically a minute or so). Instructions 158 may cause the processor 110 to actively inhibit a set of standard spin-up instructions. Instructions 158 may also cause the processor 110 to send additional instructions to keep the new storage device in a powered-off mode. Responsive to a determination that activating the new storage device would not exceed the power limit, the new storage device may be activated as per a default start-up sequence.

In one case, the data indicative of a power limit comprises a maximum power value for the storage subsystem. For example, this may be a quantity in Watts. In another case, the data indicative of a power limit comprises a maximum number of storage devices for the storage subsystem. For example, this may be X number of devices. Combinations of approaches are also possible, e.g. a power limit could be defined as multiple criteria, e.g. not exceeding P Watts OR not exceeding X devices. In one case, the data indicative of a power limit may indicate that the storage subsystem is to be limited to the storage devices detected during a boot from a power-off state (a "cold" boot).

The instructions 158 to control commands may comprise instructions to cause processor 110 to determine a type of the new storage device and send a standby command for the determined type to the new storage device. For example, a type of storage device may be defined based on a protocol that is used by the device, such as one of the protocols discussed above. A type of storage device may additionally, or alternatively, be defined based on a model of storage device. For example, different models may have different sets of available commands to restrict usage and place the device in a standby mode.

In one case, the instructions 158 to control commands may comprise instructions to determine if the new storage device is a SCSI device. Responsive to a determination that the new storage device is a SCSI device, the instructions may be configured to cause the processor 110 to send a SCSI START STOP UNIT command with one of a START bit set to zero, or a POWER CONDITION field set to transition to a standby_z power condition. These commands prevent the SCSI device from being powered to an operational state automatically when the device is connected (i.e. hot-plugged in). Additionally, or alternatively, the instructions may cause the processor 110 to determine if the new storage device is an ATA device and, responsive to a determination that the new storage device is an ATA device, send one of a STANDBY IMMEDIATE command and a SLEEP command.

In one case, SATA data storage devices are used that are arranged to spin-up automatically. Different data storage devices may have different initialization routines. In this case, the storage controller is arranged to withhold the completion of an Out-Of-Band (OOB) sequence, which is used in comparative cases to activate the data storage device. In another case, SAS data storage devices are used that may be prevented from activating (i.e. spinning up) via the START STOP UNIT command described above. In this case, if a data storage device has been powered down using the START STOP UNIT command, it may be activated at a later point (e.g. when power is available) using a NOTIFY (ENABLE SPINUP) command.

These commands to withhold OOB routines, power down the new storage device, or place it in a standby state (i.e. a state that uses no or a low amount of power), may be used in storage controllers that implement a staggered spin-up of storage devices. In these cases, activation permissions may be rotated between sets of N devices for periods of M seconds. For example, N may equal 5 and M may equal 15 seconds. In this case, if 15 new storage devices are added during powered operation, these devices will be activated as follows: a first batch of 5 devices is spun-up in the first 15 seconds; a second batch of 5 devices is spun-up in the following 15 seconds (e.g. between 15-30 seconds following insertion); and a third batch of 5 devices is spun-up in the last 15 seconds (e.g. between 30-45 seconds following insertion). In these case, even though spin-up is staggered to avoid power spikes, within a minute, all 15 devices may be drawing power in various states of start-up or operation. In these case, the standard staggered spin-up routines are inhibited by the storage controller 100 if a power limit is to be exceeded, such that, in a time range of minutes or hours following addition of new storage devices, power use is controlled. In a case where staggered spin-up routines are applied, the instructions 150 may be configured to send or inhibit commands via instructions 158 in a similarly staggered manner. In the former case, power-down or standby commands may be received before the storage devices are triggered to spin-up and in the latter case a comparative OOB start-up sequence may be prevented. In the aforementioned example, this control may be applied to the first batch of devices on insertion, applied to the second batch of devices within 15 seconds and applied to the third batch of devices within 30 seconds.

In certain examples, the instructions 158 to control commands comprise instructions to determine a type of the new storage device and inhibit at least one command for the determined type that brings the new storage device to an operational state. This may be applied in a similar manner to the cases above. If the new storage device is a SAS device, a NOTIFY (ENABLE SPINUP) command may be inhibited (e.g. the processor 110 may be instructed to not send this command as per a standard operation). This command may be inhibited in addition to a standard start-up sequence (e.g. a set of OOB commands). If the new storage device is a SATA device, a physical link initialization sequence may be inhibited, e.g. the device prevented from entering into a DP7:DR_Ready state. A combination of these approaches may also be used, e.g. standby commands may be sent and normal spin-up commands may be inhibited.

As such, via instructions 158, control of commands may comprise withholding or inhibiting commands (e.g. controlling an absence of commands) and/or sending commands to the data storage devices. For example, as described above, controlling commands may include controlling the use of SAS primitives, such as the NOTIFY (ENABLE SPINUP) command, as well as withholding an OOB sequence for SATA devices. Controlling commands may additionally, or alternatively, refer to controlling (e.g. sending or inhibiting) SCSI and/or ATA commands.

Figure 2:
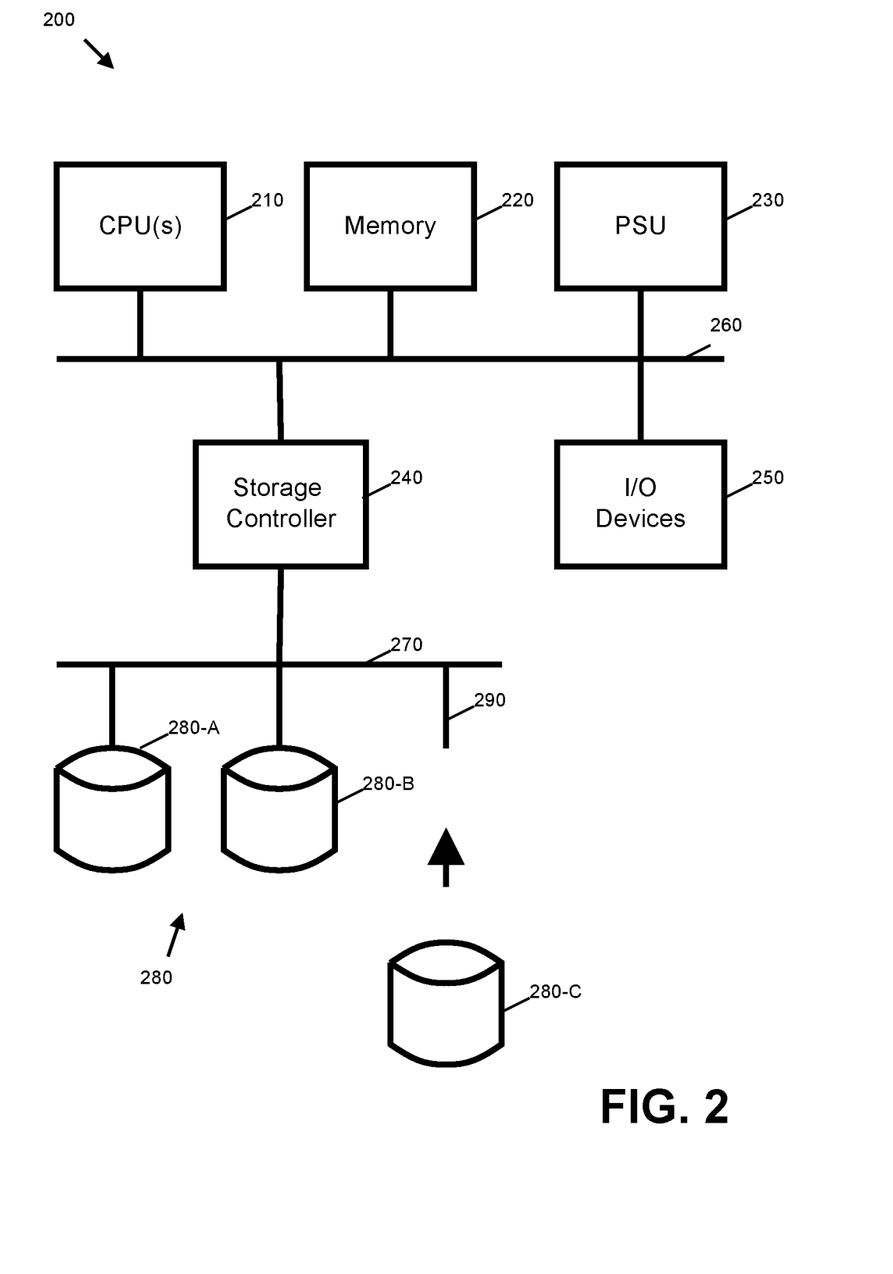
FIG. 2 is a schematic diagram of a server computing device according to an example.

FIG. 2 shows an example of a server computing device 200 according to an example. Certain components of this device are shown schematically to better understand the present examples but should not be seen as limiting; other configurations, arrangements and components are possible.

The server computing device 200 comprises a set of CPUs 210, memory 220, a power supply unit 230, a storage controller 240 and other input/output (I/O devices) 250. The storage controller 240 may comprise an implementation of the storage controller 100 from FIG. 1. The I/O devices 250 may comprise, amongst others, graphics processing units (GPUs) and peripherals such as serially attached devices. In FIG. 2 these components are electrically coupled by a systems bus 260. In implementations the systems bus 260 may utilize one or more interconnect protocols. The power supply unit 230 may receive mains power and/or run from battery power (e.g. from a rechargeable battery). It may be configured to provide a predefined amount of power to the server computing device 200. The components shown in FIG. 2 may be provided in a common enclosure or within a plurality of separate enclosures coupled using appropriate cabling.

The storage controller 240 is shown connected to a plurality of storage devices 280. In FIG. 2, two storage devices are coupled to the storage controller 240 via an interconnect 270. The interconnect 270 provides a number of physical interfaces to connect storage devices. Storage devices 280-A and 280-B are coupled to the first two physical interfaces. The third physical interface 290 is available for connection to a new storage device 280-C.

Figure 3:
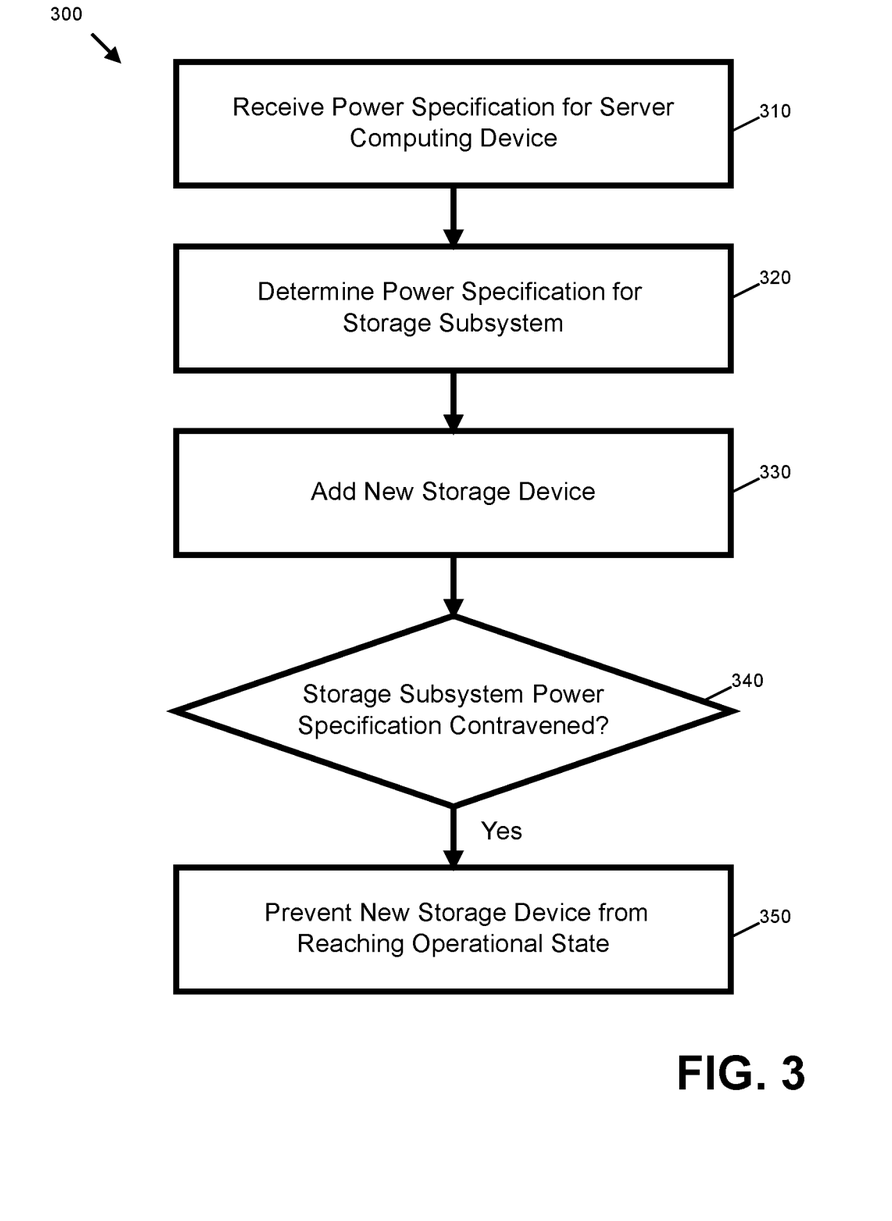
FIG. 3 is a flow diagram showing a method of controlling a server computing device according to an example.

FIG. 2 shows an example context in which the storage controller 100 may be used. FIG. 3 shows a method 300 of controlling a server computing device, such as server computing device 200. Method 300 may use, or be performed in whole or in part by storage controller 100 or storage controller 240, for example.

At block 310, a power specification for the server computing device is received. The power specification may comprise a maximum power limit for the server computing device 200 and/or power limits for each of the components 210 to 250. In one case, the power specification is set by an operator, e.g. via a graphical user interface. In one case, the power specification includes the limits of the power supply unit 230. The power specification may indicate any minimum power limits that need to be met to ensure operation, e.g. a memory, CPU or GPU may have a minimum power limit below which operation is not possible. A power specification may set a maximum power limit below a maximum power limit of the power supply unit 230, e.g. to reduce power consumption. The power specification may also be dynamic and change with one or more of time of operation and loading. In this case, the power specification may still be subject to minimum and maximum power limits as described.

At block 320, a power specification for a storage subsystem of the server computing device that meets the power specification for the server computing device is determined. For example, this may comprise a maximum power limit for the storage controller 240. In certain cases, this may comprise determining a share of power to assign to the storage subsystem (e.g. 50 W of a 400 W supply or 20% of a maximum power limit) and then computing a number of storage devices that this share of power can support (e.g. 5 devices running at a steady state of 9 W and/or 2 devices starting up each using 25 W).

At block 330, during operation of the server computing device, an addition of a new storage device to the storage subsystem is detected. For example, this may comprise hot-plugging in storage device 280-C as shown in FIG. 2. This block includes supplying power to the new storage device, e.g. as device 280-C is connected to the physical interface 290 it may be able to draw power from the interconnect 270 (or a separate power source).

At block 340, it is determined whether bringing the new storage device to an operational state contravenes the power specification for the storage subsystem. For example, if the two storage devices are 3.5 inch drives each requiring 18 W and a new 2.5 inch drive is to be connected that uses 25 W to spin-up, then a power specification of 50 W for the storage subsystem would be contravened (61 W would be required).

At block 350, responsive to a determination that bringing the new storage device to an operational state contravenes the power specification for storage subsystem, the new storage device is prevented from reaching the operational state. For example, even if storage device 280-C is coupled to the physical interface 290 and is capable of drawing power from the interconnect 270, its operation may be inhibited and/or it may be placed in a no or low power state by the storage controller 240. Responsive to a determination that bringing the new storage device to an operational state meets (i.e. does not contravene) the power specification for storage subsystem, the new storage device may be activated as per standard procedures, e.g. storage device 280-C may be spun-up ready for data access.

The example method 300 of FIG. 3, may be performed in a case where an operator sets a power budget for one or more server computing devices. In certain cases, as well as controlling storage devices, the power budget may be enforced by controlling processor states, e.g. by throttling processor cycles. A minimum and maximum power consumption for a server computing device may be determined by measuring power consumption during idle operation and a simulated maximum load, e.g. based on processor utilization.

Certain examples described herein are useful as many data storage devices attempt to spin-up on supply of power as a default operation. For example, many disk drive manufactures specify that drives are to be spun-up on receipt of power to test for stiction issues and/or provide other operation tests.

Figure 4:
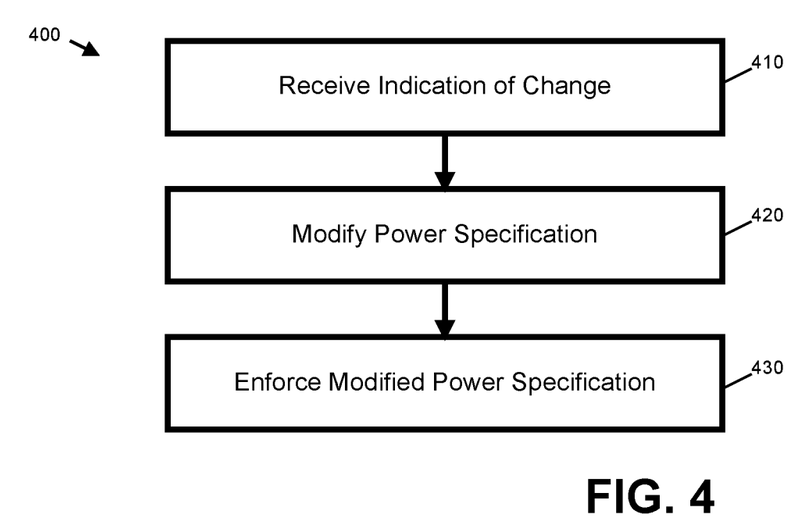
FIG. 4 is a flow diagram showing a method of modifying a power specification according to an example.

FIG. 4 shows a method 400 that may be applied in association with method 300 of FIG. 3. Method 400 may use or be performed in whole or in part by storage controller 100 or storage controller 240, for example. At block 410, an indication of a change in a hardware configuration of the server computer device is received. For example, this may be activation of more CPUs to cope with increased loading, the addition of a peripheral, or a change from one power profile to another power profile. At block 420, the power specification for the storage subsystem is modified to accommodate the change in the hardware configuration. For example, if more CPUs are to be activated then a power budget for the storage subsystem may be reduced, such as from 50 W to 40 W where those 10 W are used to power the CPUs. At block 430, the storage subsystem is controlled to enforce the modified power specification. This may comprise changing a power limit applied by the storage controller 240. It may also comprise powering down existing drives, e.g. one drive in a RAID array of redundant drives. Hence, the number of hot-pluggable drives that will be powered up may be dynamic and change with operation of the server computing device, e.g. as enforced by storage controller 240.

Figure 5:
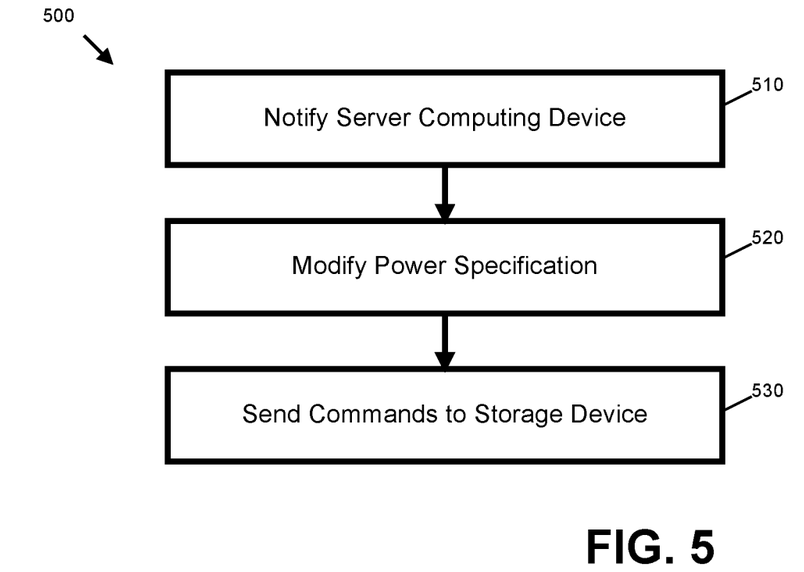
FIG. 5 is a flow diagram showing another method of modifying a power specification according to an example.

FIG. 5 shows a similar method 500 wherein the power specification of the storage subsystem may be modified based on detection of a new storage device. Method 500 may use or be performed in whole or in part by storage controller 100 or storage controller 240, for example. At block 510, the server computing device is notified of the addition of the new storage device. This may be performed by storage controller 240 sending a message across the system bus 260 to a control process being executed by one of the CPUs 210. At block 520, the power specification for the storage subsystem is modified to allow the new storage device to be brought to an operational state. This may be performed by the aforementioned control process. This may comprise increasing a power limit for the storage subsystem. To keep power use below a set power limit for the server computing device, this block may include modifying a power specification for an other subsystem of the server computing device, e.g. reducing a power limit for CPUs 210 or memory 220. At block 530, commands are sent to the new storage device to bring it to the operational state. For example, in response to a notification sent by the storage controller 240, a control process operating on CPUs 210 may increase the power limit for the storage subsystem and send a response to the storage controller 240 informing it of the revised power specification. The revised power specification may allow the storage controller 240 to spin-up an added device. Following the example above, if a power limit is increased to 65 W then storage device 280-C may be added and spun-up without going beyond the power limit. The commands may comprise commands to bring the storage device out of a standby state and/or to spin-up the storage device. These commands may comprise commands that were originally inhibited by the storage controller 240 at block 350 in the method 300 of FIG. 3.

The modification to the power specification for the storage subsystem and the other subsystem may be active for a defined time period. This defined time period may comprise a length of time in which to spin-up a storage device and obtain a steady operational state. In this case, the commands are sent to the new storage device during the defined time period. Once the defined time period ends, the power limit may return to an original value. By this time, a spike in power consumption may have passed and the storage device may be used in a medium power operational state. Following the previous example, if two storage devices are 3.5 inch drives each requiring 18 W and a new 2.5 inch drive is to be connected that uses 25 W to spin-up but 9 W in a steady operational state, then a power specification may be raised to 65 W for 1 or 2 minutes to allow spin-up, then reduced back to 50 W, wherein the power use now becomes 18 W+25 W=43 W, which is under the 50 W limit. However, in this case, if the system is shut down and rebooted, then not all storage devices may be spun-up on the reboot, as this would contravene the 50 W limit. In this case, a staggered spin-up may be implemented, or the method of FIG. 5 repeated.

Figure 6:
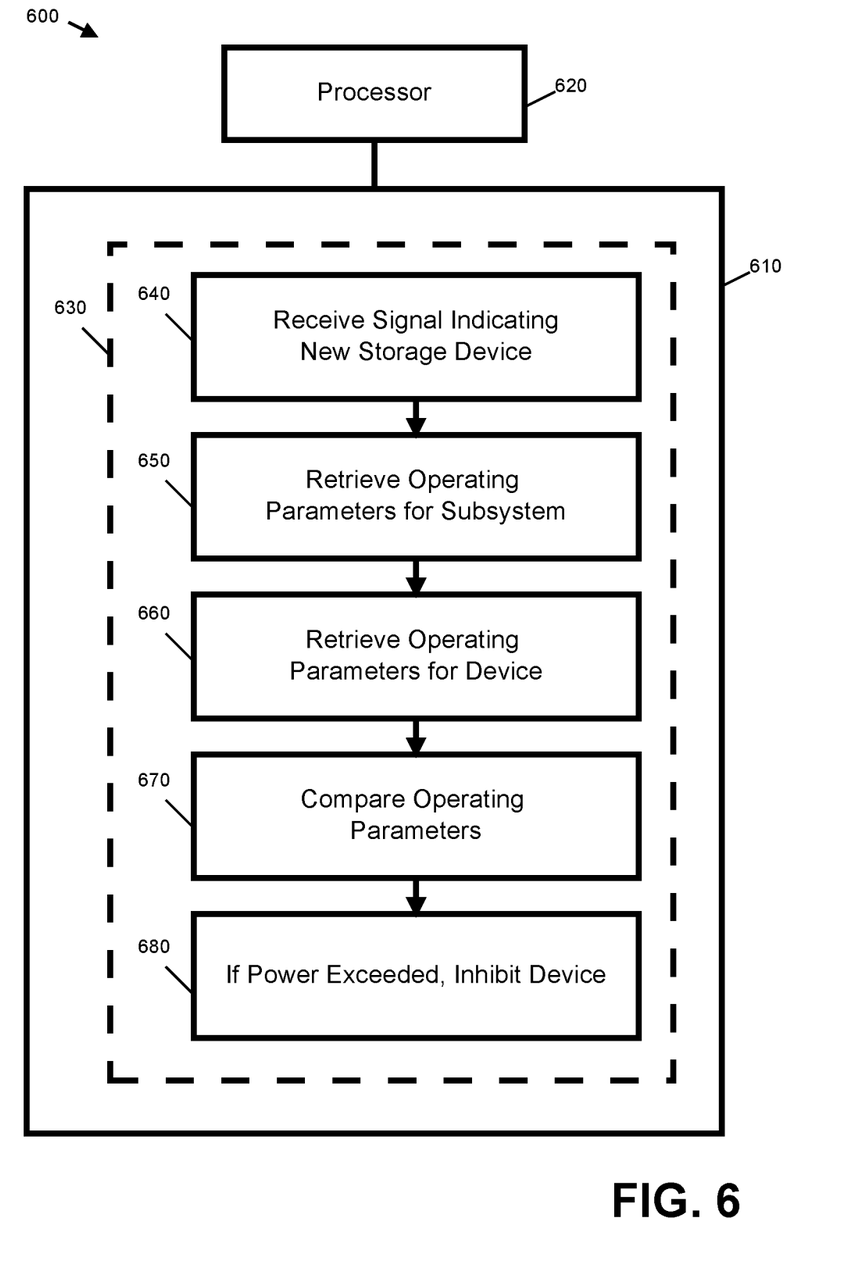
FIG. 6 is a schematic diagram showing a non-transitory computer-readable storage medium according to an example.

FIG. 6 shows an example 600 of a non-transitory computer-readable storage medium 610 storing instructions that, when executed by a processor 620, cause the processor to perform at least the functionalities described herein in relation to instructions 640, 650, 66, 670, and 680. In one case, the processor 620 may comprise processor 110 in FIG.

1, and the storage medium comprise the second storage medium 130 in FIG. 1. In other cases, the storage medium 610 and the processor 620 may comprise part of a different device.

As described previously, the machine-readable storage medium may be any electronic, magnetic, optical, or other physical storage device that contains or stores executable instructions 630. Similarly, the processor may include at least one central processing unit (CPU), at least one semiconductor-based microprocessor, other hardware devices or processing elements suitable to retrieve and execute instructions stored in memory, or combinations thereof.

Processor 620 may execute instructions 640 to receive a signal indicating that a new storage device is receiving power in a storage subsystem. This may occur following insertion of new storage device 280-C and coupling to the physical interface 290. This signal may be received across the interconnect 270. Processor 620 may execute instructions 650 to retrieve, from memory, operating parameters for the storage subsystem that indicate a maximum power to be drawn by the storage subsystem, and processor 620 may execute instructions 660 to retrieve, from memory, operating parameters for the new storage device. The operating parameters for the new storage device may be received as data from the new storage device after power is supplied but before the first set of instructions are executed, e.g. as part of one or more data packets or messages exchanged between storage device 280-C and the storage controller 240 over the interconnect 270. Processor 620 may execute instructions 670 to compare the operating parameters for the storage subsystem and the operating parameters for the new storage device to determine whether processing a first set of instructions to allow use of the new storage device would result in the maximum power being exceeded. This may comprise adding a spin-up power draw for the storage device to a current power use by the storage subsystem and determining whether this violates the power limit. The first set of instructions may comprise sending a standard or default set of commands to the new storage device when it is detected on interconnect 270 by the storage controller 240. Responsive to a determination that use of the new storage device would result in the maximum power being exceeded, processor 620 may execute instructions 680 to inhibit use of the new storage device by processing a second set of instructions in place of the first set of instructions. This second set of instructions may comprise instructions that inhibit commands sent by the first set of instructions and/or, in their place, sending power down or standby commands. Responsive to a determination that use of the new storage device would not result in the maximum power being exceeded, the first set of instructions may be processed as usual. The first and second sets of instructions are different but may not be exclusive, i.e. some commands may be command to both sets.

Although the disclosure herein has been described with reference to particular examples, it is to be understood that these examples are merely illustrative of the principles of the disclosure. It is therefore to be understood that numerous modifications may be made to the examples and that other arrangements may be devised without departing from the spirit and scope of the disclosure as defined by the appended claims. Furthermore, while particular processes are shown in a specific order in the appended drawings, such processes are not limited to any particular order unless such order is expressly set forth herein: rather, processes may be performed in a different order or concurrently and blocks may be added or omitted. All of the features disclosed in this specification (including any accompanying claims, abstract and drawings), and/or all of the elements of any method or process so disclosed, may be combined in any combination, except combinations where at least some of such features and/or elements are mutually exclusive.

What is claimed is:

1. A storage controller to control a plurality of storage devices to implement a storage subsystem comprising:
   a first storage medium to store data indicative of a power limit for the storage subsystem;
   a processor to control the operation of the plurality of storage devices such that power use by the storage subsystem is maintained below the power limit; and
   a second storage medium to store a set of instructions that, when executed by the processor, cause the processor to:
      detect a new storage device that is coupled to the storage controller during powered operation of the storage controller;
      determine an operational state of the storage subsystem;
      process data associated with the new storage device, data associated with the operational state and the data indicative of the power limit to determine whether activating the new storage device would exceed the power limit; and
      control commands sent to the new storage device to inhibit activation of the new storage device responsive to a determination that activating the new storage device would exceed the power limit.

2. The storage controller of claim 1, wherein the data indicative of a power limit comprises a maximum power value for the storage subsystem.

3. The storage controller of claim 1, wherein the data indicative of a power limit comprises a maximum number of storage devices for the storage subsystem.

4. The storage controller of claim 1, wherein the instructions to control commands comprise instructions to:
   determine a type of the new storage device; and
   send a standby command for the determined type to the new storage device.

5. The storage controller of claim 1, wherein the instructions to control commands comprise instructions to:
   determine if the new storage device is a Small Computer System Interface (SCSI) device; and
   responsive to a determination that the new storage device is a SCSI device, send a SCSI START STOP UNIT command with one of:
      a START bit set to zero; or
      a POWER CONDITION field set to transition to a standby_z power condition.

6. The storage controller of claim 1, wherein the instructions to control commands comprise instructions to:
   determine if the new storage device is an Advanced Technology Attachment (ATA) device; and
   responsive to a determination that the new storage device is an ATA device, send one of a STANDBY IMMEDIATE command or a SLEEP command.

7. The storage controller of claim 1, wherein the instructions to control commands comprise instructions to:
   determine a type of the new storage device; and
   inhibit at least one command for the determined type that brings the new storage device to an operational state.

8. The storage controller of claim 1, wherein the instructions to control commands comprise instructions to:
   determine if the new storage device is a Serial Attached Small Computer System Interface (SAS) device; and responsive to a determination that the new storage device is an SAS device, inhibit a NOTIFY (ENABLE SPINUP) command.

9. The storage controller of claim 1, wherein the instructions to control commands comprise instructions to:
determine if the new storage device is a Serial Advanced Technology Attachment (SATA) device; and
responsive to a determination that the new storage device is a SATA device, inhibit a physical link initialization sequence.

10. A method of controlling a server computing device, comprising:
receiving a power specification for the server computing device;
determining a power specification for a storage subsystem of the server computing device that meets the power specification for the server computing device;
during operation of the server computing device, detecting an addition of a new storage device to the storage subsystem, including supplying power to the new storage device;
determining whether bringing the new storage device to an operational state contravenes the power specification for the storage subsystem; and
responsive to a determination that bringing the new storage device to an operational state contravenes the power specification for storage subsystem, preventing the new storage device from reaching the operational state.

11. The method of claim 10, comprising:
receiving an indication of a change in a hardware configuration of the server computer device;
modifying the power specification for the storage subsystem to accommodate the change in the hardware configuration; and
controlling the storage subsystem to enforce the modified power specification.

12. The method of claim 10, comprising:
notifying the server computing device of the addition of the new storage device;
modifying the power specification for the storage subsystem to bring the new storage device to an operational state, including modifying a power specification for an other subsystem of the server computing device; and
sending commands to the new storage device to bring it to the operational state.

13. The method of claim 12, wherein the modification to the power specification for the storage subsystem and the other subsystem is active for a defined time period, and wherein the commands are sent to the new storage device during the defined time period.

14. A non-transitory computer-readable storage medium storing instructions that, when executed by a processor, cause the processor to:
receive a signal indicating that a new storage device is receiving power in a storage subsystem;
retrieve, from memory, operating parameters for the storage subsystem that indicate a maximum power to be drawn by the storage subsystem;
retrieve, from memory, operating parameters for the new storage device;
compare the operating parameters for the storage subsystem and the operating parameters for the new storage device to determine whether processing a first set of instructions to allow use of the new storage device would result in the maximum power being exceeded; and
responsive to a determination that use of the new storage device would result in the maximum power being exceeded, inhibit use of the new storage device by processing a second set of instructions in place of the first set of instructions.

15. The medium of claim 14, wherein the operating parameters for the new storage device are received as data from the new storage device after power is supplied but before the first set of instructions are executed.

* * * * *